United States Patent
Tanis et al.

(10) Patent No.: US 7,186,177 B2
(45) Date of Patent: Mar. 6, 2007

(54) COMBINE THRESHING ROTOR FRONT BEARING AND INLET SECTION WITH ANTI-WIND FEATURES

(75) Inventors: Dale R. Tanis, Geneseo, IL (US); Craig E. Murray, Geneseo, IL (US); Mark J. Svitak, Colona, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/435,583

(22) Filed: May 17, 2006

(65) Prior Publication Data

US 2006/0205453 A1    Sep. 14, 2006

Related U.S. Application Data

(62) Division of application No. 11/068,114, filed on Feb. 28, 2005.

(51) Int. Cl.
*A01F 12/10* (2006.01)
(52) U.S. Cl. .................................. 460/70; 460/68
(58) Field of Classification Search ................ 460/70, 460/68, 80, 116; 198/660, 661, 676
See application file for complete search history.

(56) References Cited

U.S. PATENT DOCUMENTS

| | | | |
|---|---|---|---|
| 3,828,794 A | 8/1974 | Gochanour et al. | 130/27 T |
| 4,175,568 A | 11/1979 | Nooyen | 130/27 T |
| 4,250,896 A | 2/1981 | Wagstaff et al. | 130/27 T |
| 4,344,442 A * | 8/1982 | Torland et al. | 460/116 |
| 4,733,672 A | 3/1988 | Tophinke | 130/27 T |
| 4,900,290 A | 2/1990 | Tanis | 460/70 |
| 5,145,462 A | 9/1992 | Tanis et al. | 460/68 |
| 5,257,959 A | 11/1993 | Tanis | 460/67 |
| 5,387,153 A | 2/1995 | Tanis | 460/68 |
| 6,083,102 A | 7/2000 | Pfeiffer | 460/68 |
| 6,296,566 B1 | 10/2001 | Tanis et al. | 460/70 |
| 6,679,773 B2 | 1/2004 | Schwersmann | 460/70 |
| 6,688,970 B2 | 2/2004 | Tanis | 460/68 |
| 6,719,626 B2 | 4/2004 | Federowich | 460/70 |
| 7,146,790 B2 * | 12/2006 | Duquesne et al. | 56/220 |

* cited by examiner

*Primary Examiner*—Árpád Fábián Kovács
(74) *Attorney, Agent, or Firm*—Michael G. Harms; John William Stader; Stephen A. Bucchianeri

(57) ABSTRACT

A threshing front rotor inlet section and front bearing housing shroud assembly for an agricultural combine. The front rotor inlet section includes a center body or plate having a radial outer circumferential periphery and a substantially annular protuberance extending forwardly therefrom concentric with a rotational axis thereof. The protuberance has at least one slot extending radially therethrough defined by one or more edges and/or surfaces which face in the rotational direction and are raked back in the radial outward direction, for pushing crop material, radially outwardly for conveyance rearwardly by impeller augers or flights of the rotor. Other surfaces can also be provided around the outer periphery for pushing longer plant material away from spaces between the inlet section and bearing housing and shroud.

6 Claims, 5 Drawing Sheets

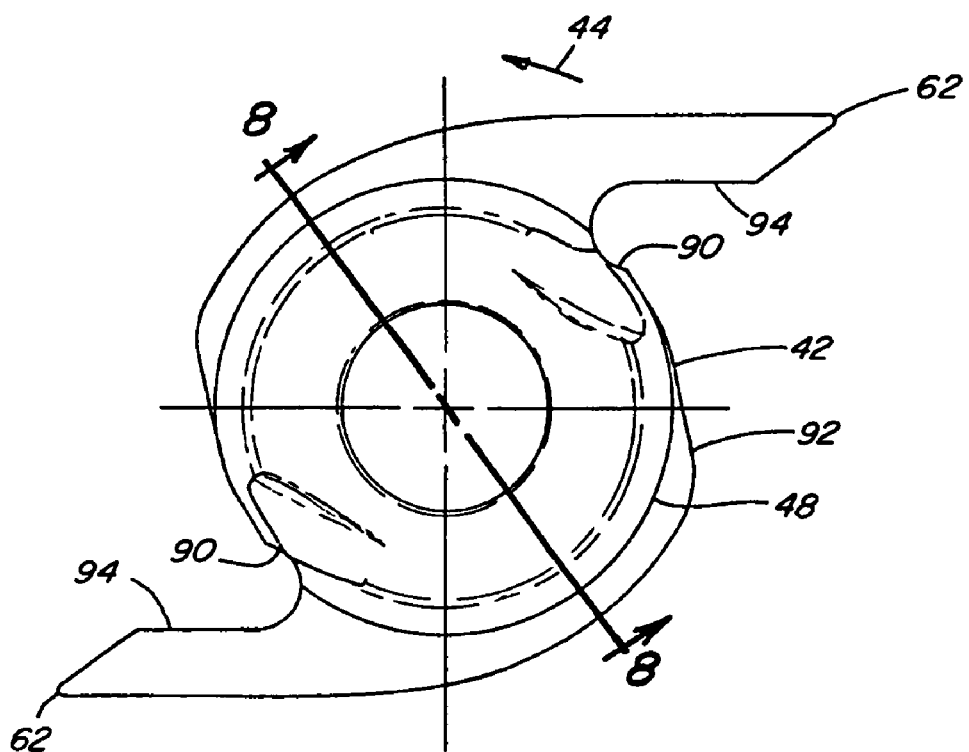
Fig. 7
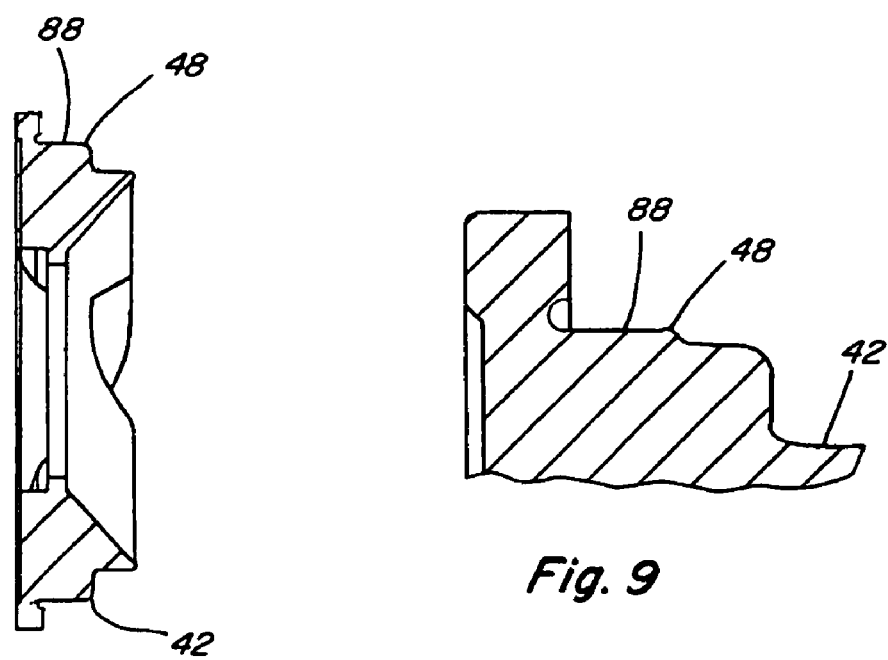
Fig. 8
Fig. 9

COMBINE THRESHING ROTOR FRONT BEARING AND INLET SECTION WITH ANTI-WIND FEATURES

TECHNICAL FIELD

This divisional application claims priority under 35 U.S.C. §120 from co-pending U.S. patent application Ser. No. 11/068,114 filed on Feb. 28, 2005 by Dale R. Tanis et al. with the same title, the full disclosure of which is hereby incorporated by reference.

The present invention relates generally to agricultural combine rotors, and more particularly, to a front bearing housing and front rotor inlet section combination having anti-wind features for preventing winding or wrapping of plant materials therearound.

BACKGROUND ART

A well-known form of harvesting machine is a rotary combine. A typical combine includes a crop harvesting apparatus which reaps grain stalks and other plant materials and feed them to a separating or threshing apparatus. The grain stalks or other crop and plant materials harvested in the field are moved rearwardly from a crop harvesting header assembly and introduced for threshing to the rotor assembly by a crop feeder assembly.

In a rotary combine, the rotor assembly includes a generally tubular rotor housing mounted in the combine body. A driven rotor is coaxially mounted within the housing. The rotor comprises an infeed or inlet section and a cylindrical threshing section, and is supported at opposite ends by front and rear bearing assemblies.

The cylindrical threshing section of the rotor and the rotor housing mount cooperating threshing elements which separate grain from other material in a threshing zone. The crop material is threshed as it spirals around the rotor threshing section and passes through openings in the rotor housing.

As discussed in Tanis U.S. Pat. No. 5,387,153, assigned to the same assignee as the present invention, the ability to transfer crop materials from the feeder assembly to the threshing zone of the rotor assembly is a key to efficient combine operations. Most rotary combine rotors include an infeed or inlet section impeller comprised of a series of impeller blades or flights arranged at a forward end of the rotor. The impeller flights rotate within a housing which is a part of the rotor housing. During harvesting operations, the generally linear movement of the crop materials received from the feeder assembly is converted by the rotating impeller flights into a rotating, circulatory movement, in a rearward and outward direction.

When rotary combines are used on certain long-stemmed leguminous or grassy crops, such as windrowed perennial or annual rye grass, clover, and bent grass, and oats, there is a potential for portions of such grassy crops and other plant materials such as weeds to extend into the impeller flights while other portions remain partially engaged with the feeder assembly. The latter portions tend to move toward the axis of rotation of the rotor assembly, and may wrap about the front rotor bearing or shaft. This can rob power and cause damaging heat build up around the bearing, potentially causing premature failure thereof.

Long-stemmed leguminous or grassy crops also have a tendency to wrap around or "hairpin" about the leading edge of the impeller blades or flights. This hairpinning action can create a buildup of crop materials on the aforementioned leading edge, which reduces the effectiveness of the impeller and further reduces combine efficiency.

Numerous front rotor inlet and bearing housing designs, including that disclosed in the above referenced Tanis patent, have been proposed to prevent crop materials from becoming entangled with the front rotor bearing and prevent hairpinning about the impeller blades' leading edges. None has been thoroughly successful in doing so, however. Furthermore, these designs suffer from a multitude of individual parts, and the higher costs associated therewith.

Tanis U.S. Pat. No. 6,296,566, also assigned to the same assignee as the present invention, discloses an infeed impeller for a rotary combine which utilizes anti-winding vanes on the rotor which cooperate with vanes on the front bearing assembly to force debris radially outwardly away from the axis of the rotor. However, this combination has been found to also suffer from the above-discussed shortcomings, more particularly, that long, particularly wet, crop material winds onto the rotor shaft which creates heat, consumes power, and causes early bearing failures.

Accordingly, what is sought is a front bearing housing anti-wind element and/or front rotor inlet section which provides improved anti-wind characteristics, particularly with regard to long, wet straw and other crop material.

SUMMARY OF THE INVENTION

According to a preferred aspect of the invention, a front rotor inlet section for a threshing rotor of an agricultural combine, which provides one or more of the above sought characteristics, is disclosed. The front rotor inlet section includes a center body or plate adapted to be mounted on a front end of a rotor around a frontwardly and rearwardly extending rotational axis therethrough for rotation with the rotor in a predetermined rotational direction about the rotational axis. The body preferably has a radial outer circumferential periphery and a substantially annular protuberance extending frontwardly therefrom concentric with the rotational axis. The protuberance has a radially outwardly facing outer circumferential surface, a radially inwardly facing inner circumferential surface located radially inwardly of the outer circumferential surface, and extends around and defines a front center space. The protuberance preferably includes at least one frontwardly facing slot extending radially therethrough, the slot being defined at least in part by one or more edges and/or surfaces which face in the rotational direction and are raked back in the radial outward direction relative to the rotational direction, so as to be operable for pushing crop material, particularly long elements of straw and the like, brought into contact therewith during rotation thereof, radially outwardly toward the radial outer periphery of the body, for conveyance rearwardly by impeller augers or flights of the rotor.

The protuberance is adapted to be positioned in an annular or circular space between a bearing housing and a shroud extending therearound radially outwardly thereof, with the bearing housing extending into the front center space. As a result, during the rotation of the inlet section, the protuberance will rotate around the exterior of the bearing housing, and any long elements of plant material, such as long wet straw, will be brought into contact with the edges and/or surfaces of the at least one slot, so as to be pushed radially outwardly thereby, away from the bearing housing. The plant material can also be cut by one or more of the edges of or adjacent to the slot. The plant material can then be carried radially outwardly and rearwardly away from the front inlet end, so as to be processed by the threshing system In this way, plant material, particularly the longer elements of plant material, such as straw and the like, are limited or prevented from wrapping around the bearing housing, so as to reduce occurrences of heat buildup and resulting bearing failures. Also, as a result of the bearing housing extending rearwardly into the front center space, no straight line radial inward path exists for passage of plant material past the bearing housing and into the front center space, where the plant material could otherwise wrap around a shaft or other element extending axially through the inlet section and supporting it and the rotor for rotation relative to the bearing housing and shroud.

Still further, the radial outer circumferential periphery of the body of the inlet section preferably includes a machined circumferential surface concentric with the rotational axis and having a predetermined diametrical extent, adapted to rotate in closely spaced relation to and radially inwardly of an inner circumferential surface of the shroud, to provide another barrier to passage of plant material radially inwardly toward the bearing housing and element, such as a shaft, supporting the inlet section and rotor for the rotation.

Thus, according to a preferred aspect of the invention, the positioning and rotation of the protuberance radially outwardly of the bearing housing in axial overlapping relation thereto, and the pushing of crop material radially outwardly away from the bearing housing by the one or more edges and/or surfaces of the at least one slot through the protuberance, in combination with the rotation of the machined surface of the radial outer periphery of the body in closely spaced relation to the inner periphery of the shroud, substantially limits or prevents wrapping of long crop material around the bearing housing and the shaft or other element supporting the rotor for rotation relative thereto. The at least one slot through the protuberance additionally provides a path for passage of loose plant material and the like, radially outwardly away from the front center space.

As another preferred aspect of the invention, the body further includes a pair of diametrically opposed inlet flight extensions extending radially outwardly therefrom, each of the extensions being swept back relative to the rotational direction and having a leading edge facing in the rotational direction, and an opposite trailing edge. The radial outer periphery of the body further preferably includes a pair of radially inwardly extending indentations therein, preferably located adjacent to and rearwardly of the trailing edges in the rotational direction, respectively, each of the indentations being defined at least in part by a radially outwardly facing surface oriented to push crop material brought into contact therewith during rotation of the inlet section radially outwardly, so as to preferably be placed in the path of rotation of the inlet flight extensions, so as to be carried or propelled radially outwardly away from the central region of the inlet section and the bearing housing.

BRIEF DESCRIPTION OF THE DRAWINGS

Preferred aspects of the invention, including of its construction and method of operation, are illustrated more or less diagrammatically in the drawings, in which:

FIG. 7 is a front view of the center body;

FIG. 8 is a sectional view of the center body taken along line 8—8 of FIG. 7; and FIG. 9 is an enlarged fragmentary sectional view of the center body.

DETAILED DESCRIPTION OF THE INVENTION

Figure 1:
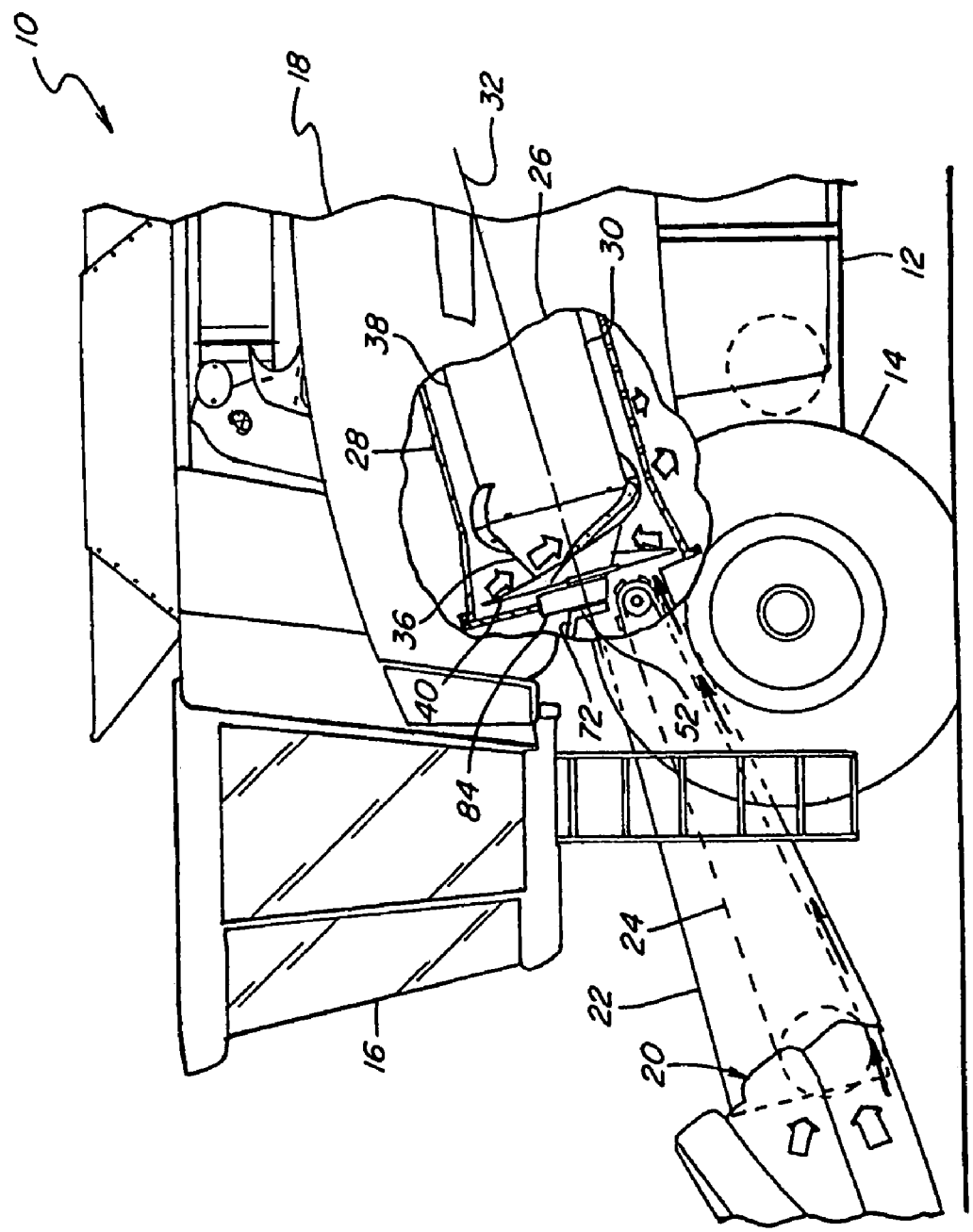
FIG. 1 is a side elevational view of a portion of a rotary combine, showing in partial section a crop feeder assembly, and a threshing rotor including a front inlet section thereof and a front bearing housing shroud assembly, the front rotor inlet section and shroud having improved anti-wind characteristics according to preferred aspects of the invention.

Referring now to the drawings, in FIG. 1 a self-propelled rotary combine is seen generally at 10. Combine 10 includes a front portion 12 including front wheels 14, an operator cab 16, and an engine (not shown) suitably supported within a body 18. The transfer of power from the engine to various driven components of combine 10 is effected conventionally.

Combine 10 is provided with a crop harvesting header assembly 20 for cutting and gathering crop materials. Header assembly 20 cuts and directs the crop material into a crop feeder assembly 22 including a conveyor 24. Conveyor 24 carries the crop material upwardly toward a rotor assembly 26, which threshes grain from material other than the grain. Rotor assembly 26 is supported in a conventional manner inside body 18. Rotor assembly 26 includes a tubular rotor housing 28 mounted in a front to rear orientation in body 18. A rotor 30 is mounted in housing 28 for rotation therein in a predetermined rotational direction about a rotational axis 32 through rotor 30 oriented at an acute angle to horizontal as shown.

Figure 2:
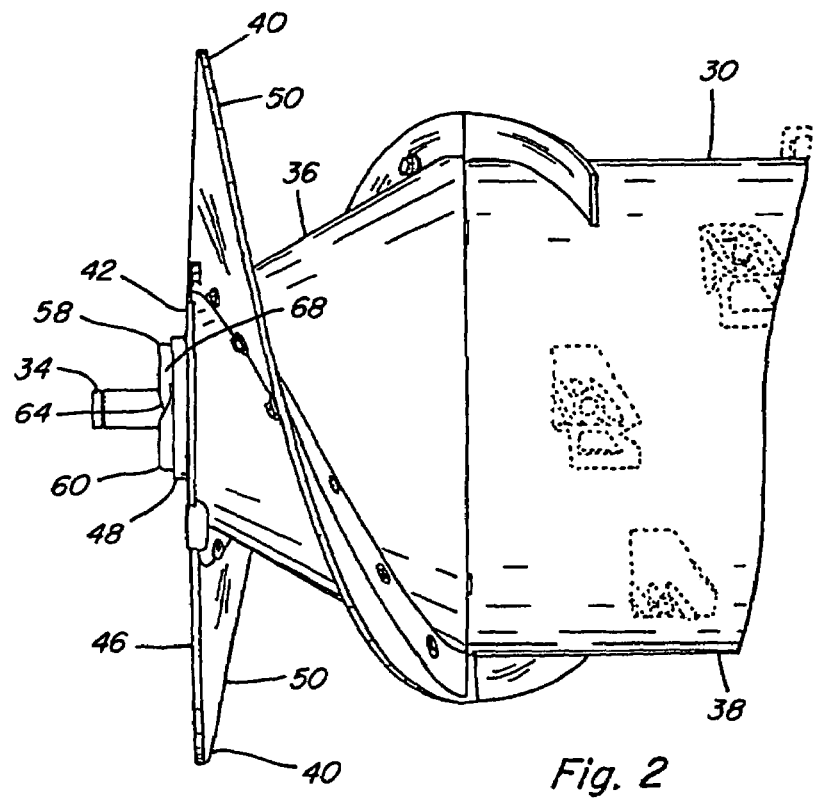
FIG. 2 is an enlarged fragmentary side view of the rotor and front inlet section of FIG. 1.
Figure 3:
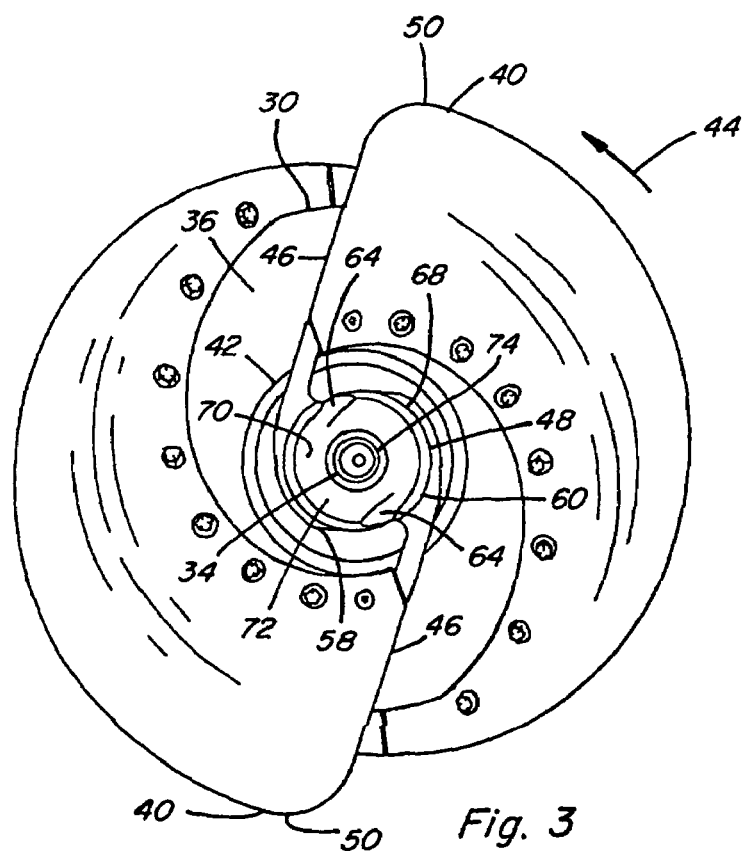
FIG. 3 is a front view of the rotor of FIG. 1.

Referring also to FIGS. 2 and 3, rotor 30 is a hollow drum rigidly affixed to a shaft 34 extending coaxially therethrough. Rotor 30 includes a front infeed or inlet section 36, and a rear threshing section 38. Front inlet section 36 includes two helical impeller augers 40 extending therearound in a rearward direction from a front center portion 42 to threshing section 38. Front inlet section has a conical shape, extending radially outwardly relative to axis 32 rearwardly from adjacent to front center portion 42 to threshing section 38. Rotor 30 is rotatable in rotor housing 28 in the rotational direction denoted by arrow 44 in FIG. 3. Each impeller auger 40 includes a flight having a leading edge 46 which extends radially outwardly with respect to axis 32 from a radial outer circumferential edge or periphery 48 of front center portion 42 having a predetermined radial extent, and terminating at a radial outer edge 50. Edges 46 are raked or swept back in relation to rotational direction 44. Each impeller auger preferably has a helical pitch that increases in the rearward direction along the length thereof, which enables augers 40 to aggressively move plant material rearwardly from feeder assembly 22 during rotation of rotor 30, while leading edges 46 is disposed and rotates in closely spaced relation to a shroud 52 which extends around and protects a front bearing housing 54 (FIGS. 1 and 6) carrying a front bearing 56 (FIG. 6) for supporting shaft 34 and thus inlet section 36 of rotor 30 for rotation, as will be explained.

Figure 4:
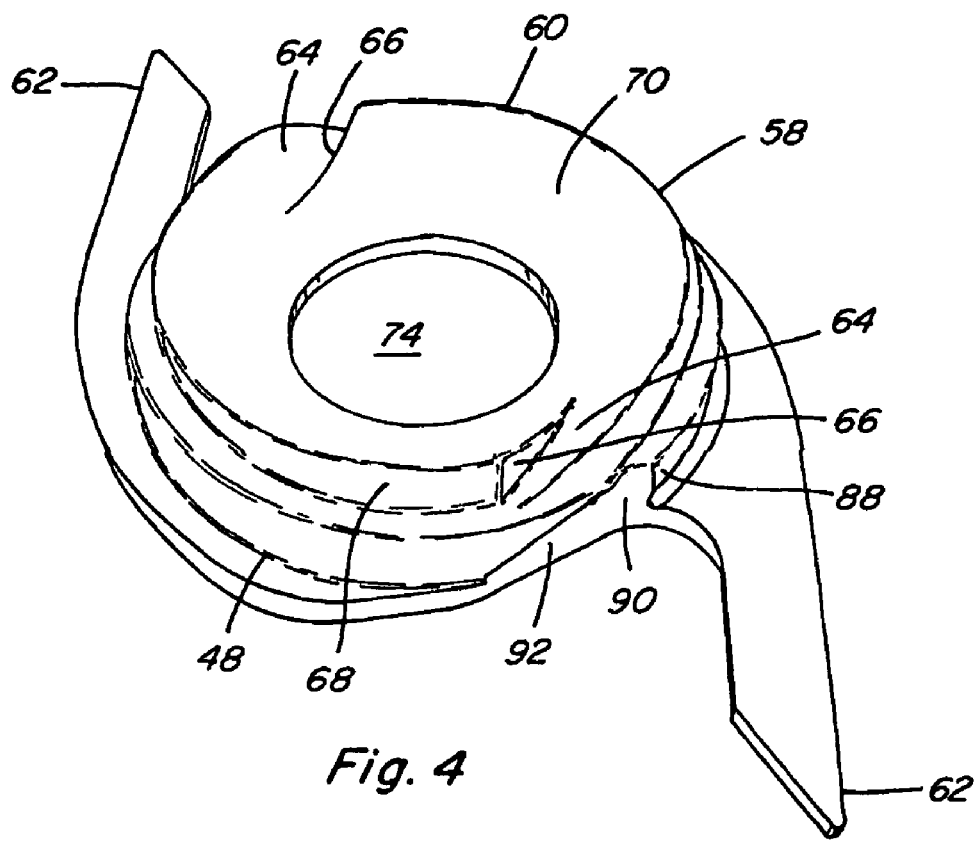
FIG. 4 is a perspective view of a center body of the front rotor inlet section of FIG. 1.
Figure 5:
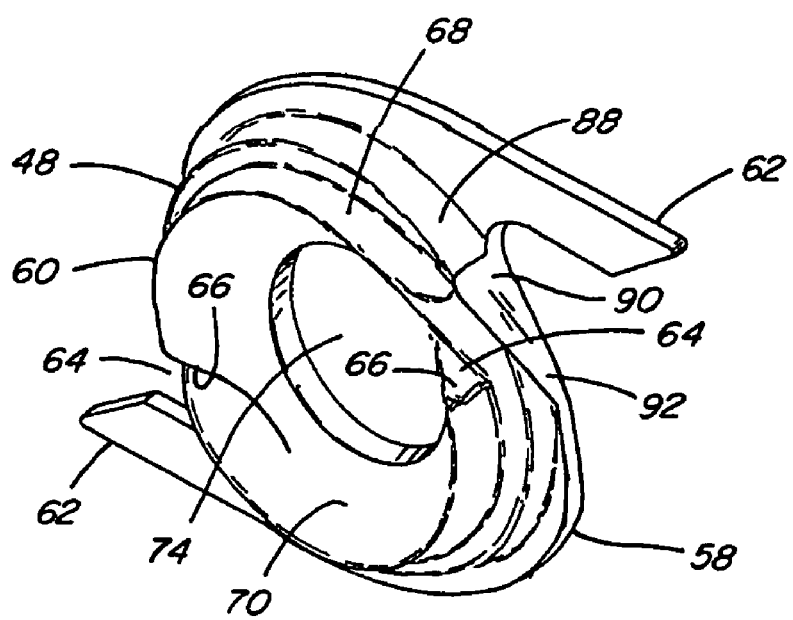
FIG. 5 is another perspective view of the center body of the front rotor of FIG. 1.

Referring also to FIGS. 4 and 5, front center portion 42 of inlet section 36 is preferably includes a front plate or a body 58 which is welded or otherwise fixedly mounted onto inlet section 36 around shaft 34. Body 58 includes radial outer periphery 48, and a frontwardly extending, substantially annular protuberance 60 therearound. Body 58 includes several anti-wind elements, including radially innermost extensions 62 of leading edges 46 of impeller augers 40 which extend radially outwardly and at least generally tangentially from radial outer periphery 48 to connect in substantially flush relation to edges 46, respectively, and which are also raked or swept back with respect to the rotational direction. Protuberance 60 preferably includes a pair of slots 64 facing frontwardly and extending radially therethrough, each slot 64 preferably bring raked or swept back relative to the rotational direction and having a surface 66 oriented to face in the rotational direction and which is swept or raked back in the radial outward direction.

Protuberance 60 has a radially outwardly facing outer circumferential surface 68 extending therearound, and a radially inwardly facing inner circumferential surface 70 therearound. Preferably, inner circumferential surface 70 has a tapered or frusto-conical shape, which extends convergingly rearwardly toward axis 32, defining a front center space 72. Inner circumferential surface 70 also extends around a center opening through which shaft 34 extends.

Figure 6:
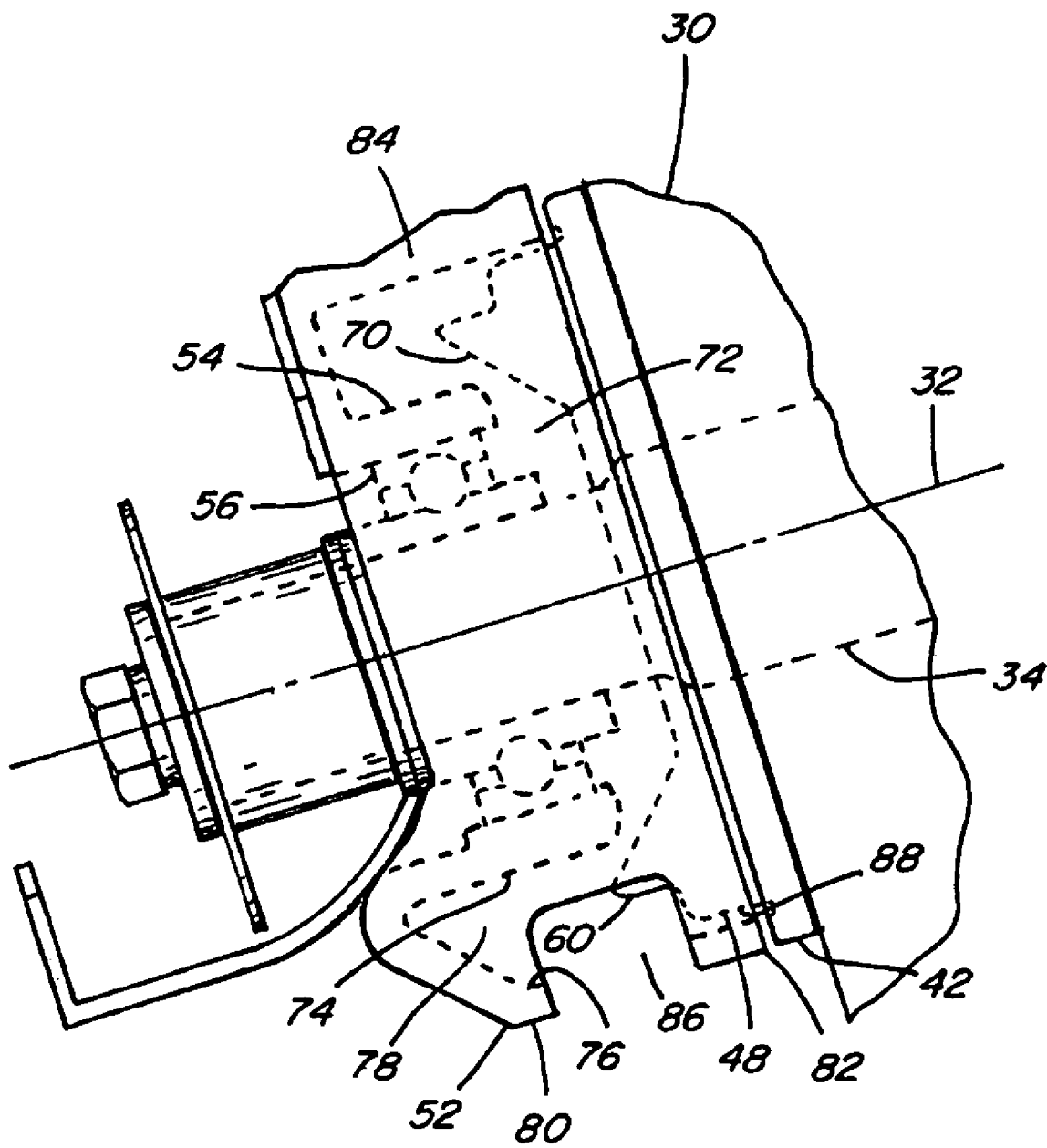
FIG. 6 is a side view of the center body of the front rotor inlet section and the front bearing housing and shroud of FIG. 1, illustrating the relationship therebetween.

Referring more particularly to FIGS. 1 and 6, shroud 52 is mounted on a support arm 72 frontwardly of inlet section 36 of rotor 30 (FIG. 1), and is preferably integrally formed or cast with front bearing housing 54 (FIG. 6). Front bearing housing 54 contains and carries conventional bearing 56 for rotatably supporting shaft 34 for rotation about axis 32, shaft 34 being affixed to and rotatably carrying and supporting inlet section 36 in the conventional manner. Bearing housing 54 has a circumferential radial outer surface 74 therearound having a predetermined radial or diametrical extent. Shroud 52 has a radial inner surface 76 having a predetermined radial extent which is greater than that of outer surface 74 of bearing housing 54, and which is located radially outwardly thereof and extends at least partially therearound, such that at least a partial or generally circular or annular space 78 or path extends around bearing housing 54 as defined by surfaces 74 and 76. Inner surface 76 is also of at least slightly or marginally greater radial extent than radial outer periphery 48 of front center portion 42 and particularly protuberance 60 projecting frontwardly therefrom, such that protuberance 60 is received in and rotates through annular space 78 when rotor 30 is rotated. Shroud 52 has a radial outer surface 80 extending at least partially therearound, and a rearward most anti-wind wiper edge 82 disposed between surfaces 76 and 80 so as to be spaced just marginally radially outwardly and frontwardly of radial outer periphery 48 of front center portion 42, and closely in front of extensions 62. Radial outer surface 80 includes an anti-wind wiper 84 that extends radially outwardly preferably at least generally tangentially from surface 80 in the rotational direction denoted by arrows 44 (FIG. 3) and includes an extension of anti-wind wiper edge 82. Wiper 84 shown has a preferred generally helicoid shape with respect to axis 32 so as to guide material radially outwardly and away from the front bearing region. Shroud 52 includes an opening 86 through the lowest or bottommost portion thereof communicating or connecting with space 78.

Superior anti-winding effect is achieved by the rotation of swept back extensions 62 of body 58 and leading edges 46 of impeller augers 40, in close relation to wiping surface 80 and anti-wind wiper 84, respectively. Extensions 62 begin at outer periphery 48 of front center portion 42, which is radially inwardly of wiping surface 80, and are preferably swept back sufficiently with respect to the rotational direction, such that at least a 90 degree included angle in the rotational direction is formed between extensions 62 and surface 80, such that plant material that comes in contact with extensions 62 is always urged radially outwardly thereby during the rotation thereof. Because leading edges 46 of augers 40 are swept back continuations of extensions 62 and augers have rearwardly increasing pitch, the material, including long wet material, is advantageously carried radially outwardly and rearwardly thereby, away from proximity to shroud 52, and hairpinning and wrapping about augers 40 is avoided. Another advantage of connecting leading edges 46 to augers 40 is that they thus perform both augering and anti-wind functions, thereby eliminating the need for additional, separate anti-wind devices extending into the crop material flow path in the infeed region. Leading edges 46 are positioned, oriented, and function in the same manner in relation to anti-wind wiper 84, namely, leading edges 46 and wiper 84 always form at least a 90 degree included angle in the rotational direction, providing the same advantages. Surfaces 66 urge any plant material coming into contact therewith during the rotation thereof radially outwardly and rearwardly, so as to be collected and carried away by augers 40, so as to clear material from around front bearing housing 54. In this regard, bearing housing 54 and shroud 52 can include surfaces positioned in close proximity to the path of protuberance 60 such that material that becomes trapped therebetween will be sheared or otherwise broken up, so as to be more easily removed by moving surfaces 66. The radially outwardly swept back orientation of surfaces 66 of slots 64 facilitates the positive pushing or directing of the material contacted thereby radially outwardly, and the orientation of surfaces 66 directed radially outwardly from space 78 in the rotational direction facilitates the flow of the material pushed or driven outwardly by surfaces 66 through slots 64. The orientation of slots 64 also makes it less likely that plant material can enter front center space 72 therethrough. Additionally, opening 86 allows small, loose particles and fragments of plant material, dust, and the like in space 78 to fall therethrough by gravity, or be pushed or driven therethrough by surfaces 66.

Referring more particularly to FIG. 6, it can be observed that front bearing housing 54 extends at least partially into front center space 72 defined by inner circumferential surface 70 of protuberance 60. As a result, protuberance 60 overlaps bearing housing 54 axially relative to rotational axis 32, such that there is no radial straight line opening or passage for plant material to enter front center space 72, and possibly wrap around shaft 34. Similarly, radial outer circumferential periphery 48 of front center portion 42 extends axially frontwardly into space 78 in closely spaced relation to radial inner surface 76 of shroud 52, such that no radial straight line path exists for plant material to reach shaft 34 at that location. Additionally, the overlapping relation of protuberance 60 to radial outer surface 74 of bearing housing 54 and the rotation of surfaces 66, functions to substantially reduce or prevent occurrences of wrapping of longer plant material around housing 54. Still further in this regard, as noted above, inner circumferential surface 70 of protuberance 60 is preferably a frusto-conical surface, so as to taper or slant radially outwardly in the frontward direction, such that in combination with the tilt of front center portion and centrifugal force generated by rotation thereof, it will facilitate flow of dust and smaller particles of plant material, dirt, and the like, outwardly from front center space 72, for removal through opening 86. Here, it should be noted that the reference to inner circumferential surface 70 having a generally frusto-conical shape is intended to include other similar shapes, such as, but not limited to, near frusto-conical, and slightly concave, curved shapes.

Referring also to FIGS. 7, 8 and 9, radial outer circumferential periphery 48 of front center portion 42 preferably includes a circular or cylindrical machined surface portion 88 therearound concentric with axis 32, and positioned to be located in closely spaced opposing relation to radial inner surface 76 of shroud 52, as best shown in FIG. 6. Radial inner surface 76 is also preferably machined in a circular shape concentric with axis 32, such that surface portion 88 will rotate in closely spaced relation to surface 76, thereby serving as a barrier to entry of plant material, particularly long plant material, therebetween.

Radial outer circumferential periphery 48, including circular surface portion 88, preferably includes at least one notch or indentation 90 therein, as best shown in FIGS. 4, 5 and 7, including and at least partially defined by a surface 92, which faces radially outwardly and is raked back relative to the rotational direction, positioned for pushing plant material radially outwardly during rotation, for clearing the plant material from the space between radial outer circumferential periphery 48 and radial inner surface 76. Extensions 62 each preferably include a trailing edge 94, each indentation 90 preferably being located just rearwardly of trailing edge 94 relative to the rotational direction. Surface 92 of each indentation 90 also preferably tapers gradually radially outwardly from the respective trailing edge 94, to push plant material into a path of rotation of extensions 62, so as to be carried or propelled radially outwardly thereby, away from the inlet section. Here, it should be noted that protuberance 60 is shown and discussed herein including two of the slots 64, located at diametrically opposed positions therethrough. It should be recognized and appreciated, however, that just one slot, or more than two slots, located at various positions through the protuberance could be used, depending on factors such as, but not limited to, characteristics of crop material with which the combine is to be used. Also, dimensions of protuberance 60, and the sectional shape thereof, can be varied as required or desired for a particular application. Similarly, the number, size, shape, angular orientation, and other features of surfaces 66 and 92, and surface portion 88, as well as the locations thereof, can be varied as required for a particular application.

Here, it should also be noted that the terms "rearward" and "rearwardly" are used in respect to rotor 30, as denoting toward the threshing end thereof, and not with respect to the rearward end of combine 10, as it is recognized that rotor 30 could be oriented otherwise than front to rearwardly with respect to combine 10, such as in a side to side orientation therein. Additionally, it should be noted that the terms "radial" and "radially" are used with respect to axis 32.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A threshing rotor and front bearing housing assembly for an agricultural combine, comprising:
   a front rotor inlet section on a front end of a rotor rotatable in a predetermined rotational direction about a frontwardly and rearwardly extending rotational axis extending therethrough, the front rotor inlet section having a radial outer circumferential surface extending therearound having a predetermined diametrical extent, and a substantially annular protuberance extending frontwardly of the outer circumferential surface, the protuberance having a radially outwardly facing outer circumferential surface, a radially inwardly facing inner circumferential surface located radially inwardly of the outer circumferential surface and extending around and defining a front center space, and at least one frontwardly facing slot extending radially outwardly through the protuberance in raked back relation to the rotational direction; and
   a front bearing housing supported on structure of the combine and located frontwardly of the front rotor inlet section, the bearing housing having a radial outer circumferential surface therearound having a predetermined diametrical extent and containing a bearing supporting the front end of the rotor and the front rotor inlet section for the rotation in the predetermined rotational direction, and an anti-wind shroud extending at least partially around the front bearing housing radially outwardly thereof and having a radial inner circumferential periphery spaced radially outwardly from a radial outer periphery of the bearing housing defining a circumferential space therebetween, the protuberance extending frontwardly into the circumferential space and the bearing housing extending into the front center space in at least partial axially overlapping relation to the protuberance, such that the inner circumferential surface of the protuberance is positioned and will rotate in closely spaced opposing relation to the outer circumferential surface of the bearing housing when the inlet section is rotated, so as to serve as a barrier for limiting passage of plant material therebetween and into the front center space, and such that surfaces in the at least one slot through the protuberance will rotate about the bearing housing during the rotation, to push plant material radially outwardly away from the bearing housing.

2. The assembly of claim 1, wherein the radially inwardly facing inner circumferential surface is generally frustoconical shaped.

3. The assembly of claim 1, wherein the shroud includes at least one opening therethrough positioned for material to be pushed therethrough by the surfaces in the at least one slot through the protuberance.

4. The assembly of claim 1, wherein the front rotor inlet section includes at least one anti-wind flight projecting radially outwardly from the radial outer periphery thereof which rotates therewith for contacting material which comes between the front inlet section and a wiping face of the shroud for urging the material radially outwardly therefrom.

5. The assembly of claim 1, wherein the shroud includes a radially outwardly extending anti-wind flight having a surface facing in the predetermined rotational direction which is raked backwardly relative thereto.

6. The assembly of claim 1, wherein the radial outer circumferential surface of the body further comprises a pair of diametrically opposed inlet flight extensions extending radially outwardly therefrom, each of the extensions being swept back relative to the rotational direction and having a leading edge facing in the rotational direction, and an opposite trailing edge, the radial outer circumferential surface further comprising a pair of radially inwardly extending indentations located adjacent to and rearwardly of the trailing edges in the rotational direction, respectively, and wherein the body includes a pair of the slots which extend to the indentations, respectively.

\* \* \* \* \*